United States Patent

Maikuma et al.

[11] Patent Number: 4,574,628
[45] Date of Patent: Mar. 11, 1986

[54] AUTOMATIC RIM REPLACING MECHANISM FOR TIRE UNIFORMITY INSPECTING MACHINES

[75] Inventors: Yoshimata Maikuma, Kobe; Yasushi Nojiri, Fukushima; Ryoichi Oda, Himeji, all of Japan

[73] Assignees: Kabushiki Kaisha Kobe Seiko Sho; Sumitomo Rubber Industries, Ltd., both of Kobe, Japan

[21] Appl. No.: 645,683

[22] Filed: Aug. 30, 1984

[30] Foreign Application Priority Data

Aug. 30, 1983 [JP] Japan .................. 58-159887
Oct. 1, 1983 [JP] Japan .................. 58-185619

[51] Int. Cl.⁴ .......................................... G01M 17/02
[52] U.S. Cl. ..................................................... 73/146
[58] Field of Search ................................ 73/146, 487

[56] References Cited

U.S. PATENT DOCUMENTS

| | | | |
|---|---|---|---|
| 3,552,200 | 1/1971 | Hermanns et al. | 73/146 |
| 3,698,233 | 10/1972 | Braden et al. | 73/146 |
| 3,728,542 | 4/1973 | Golfier | 73/146 |
| 4,380,927 | 4/1983 | Oda et al. | 73/146 |

Primary Examiner—Donald O. Woodiel
Attorney, Agent, or Firm—Oblon, Fisher, Spivak, McClelland & Maier

[57] ABSTRACT

An automatic rim replacing mechanism for a tire uniformity inspecting machine, the replacing mechanism comprising: an upper spindle having rotating means for rotation about an axis concentric with the axis of a tire to be inspected; an upper rim releasably fixed to the upper spindle by a lock means provided on the upper spindle; a lower spindle detachably connectible to a lift member of a rim lifter movable up and down in the axial direction of the tire; a lower rim assembled with and retained on the lower spindle; coupling means fittingly engageable in concentric relation with the axis of the tire for releasably coupling the upper and lower spindles; and rim retaining means provided on the lower rim or spindle for holding the upper rim when released from the upper spindle.

6 Claims, 7 Drawing Figures

FIGURE 7
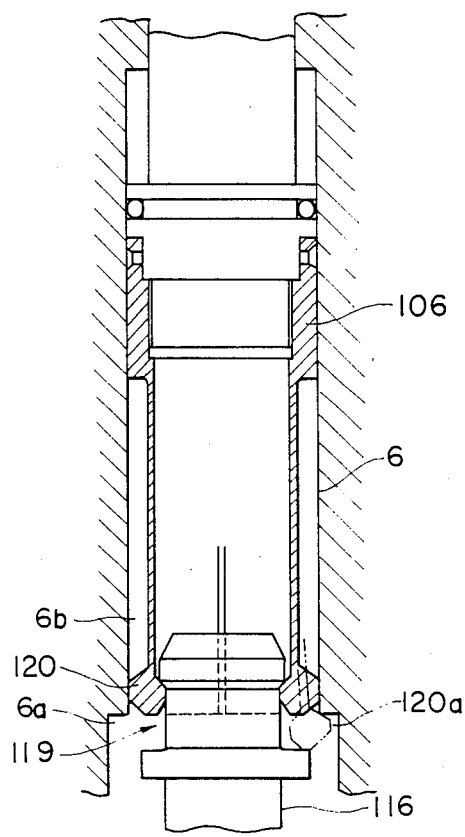
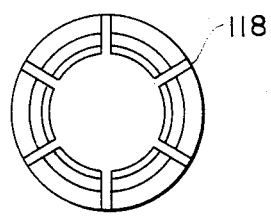

AUTOMATIC RIM REPLACING MECHANISM FOR TIRE UNIFORMITY INSPECTING MACHINES

BACKGROUND OF THE INVENTION

FIELD OF THE INVENTION

This invention relates to an automatic rim replacing mechanism capable of replacing upper and lower rims on a tire uniformity inspecting machine in a full automatic fashion, for example, at the time of changing the tire size. The rim replacing mechanism is also capable of mounting upper and lower rims corresponding to a desired tire size selectively from a number of rim assemblies of different sizes provided on a carriage or indexing table.

As well known in the art, upper and lower rims are mounted on upper and lower spindles of the tire uniformity machine by bolts or similar clamp means. A tire is held in position by the upper and lower rims during the uniformity operation, including introduction of compressed air into the tire, rotation of the tire through the upper spindle, application of load on the tire, etc. Since the rims are required to be in conformity with the tire in dimensions, a change of the tire size immediately necessitates replacement of the rims on the upper and lower spindles by rims of corresponding dimensions. This sort of inspecting machines need extremely high precision and are very expensive, so that it is uneconomical to use them exclusively for tires of a particular kind or of a particular size. Namely, it is advantageous to make the machine adaptable to as many tire sizes as possible. According to conventional procedures, the replacement of upper and lower rims usually requires a long time and a meticulous skill to set the rims in the respective positions with a high degree of accuracy. In addition, the rim replacement compels very severe working conditions since rims of relatively large weights have to be handled in a narrow restricted space all by manual labor. Therefore, the current tire uniformity machines are mostly used as a machine for a specific tire size or for tires of a restricted range in size, for the purpose of reducing the frequency of rim replacement. However, from the standpoint of operational efficiency and productivity, it is desirable to broaden the restricted range as much as possible to cope with a wider range of tire sizes. The first technical problem to be solved for this purpose is automation of the rim replacing operation for a variety of tire sizes.

SUMMARY OF THE INVENTION

It is an object of the present invention to eliminate the above-mentioned problems of the tire uniformity inspecting machine.

A more specific object of the present invention is to provide an automatic rim replacing mechanism for the tire uniformity inspecting machine.

It is a more particular object of the invention to provide an automatic rim replacing mechanism for tire uniformity inspecting machine, which can replace the rims by a full automatic operation. In this regard, instead of detachably mounting upper and lower rims on upper and lower spindles of the uniformity inspecting machine by bolts or similar clamp means, the invention employs a lock means which is actuatable by one-touch operation for detachably mount the upper rim in position on the upper spindle. With regard to the lower rim, in place of the conventional lower rim which is integrally assembled with the lower spindle, the present invention employs a lower spindle assembly which is detachably connectible to a lower spindle lift member, in combination with a rim joint means provided on the lower rim or lower spindle for retaining the upper and lower rims in joint state at the time of replacement, and a self-align-coupling means for disengageably coupling the upper and lower spindles.

It is another object of the invention to provide an automatic rim replacing mechanism for the tire uniformity inspecting machine, which is capable of selectively mounting upper and lower rims of a desired tire size by the use of a transfer means carrying a plural number of rim assemblies for different tire sizes and movable to bring a selected rim assembly into a position above a lower spindle lift member to permit prompt rim relacements and high operational efficiency.

It is a further object of the invention to provide an automatic rim replacing mechanism of the class mentioned above, employing an upper rim lock mechanism which is relible in centering and self-aligning actions.

It is a further object of the present invention to provide an automatic rim replacing mechanism of the class mentioned above, which can replace rims without inviting degradations in assembling accuracy.

According to one aspect of the present invention, there is provided an automatic rim replacing mechanism for tire uniformity inspecting machine, the replacing mechansim comprising: an upper spindle having rotating means for rotation about an axis concentric with the axis of a tire to be inspected; an upper rim releasably fixed to the upper spindle by a lock means provided on the upper spindle; a lower spindle detachably connectible to a lift member of a rim lifter movable up and down in the axial direction of the tire; a lower rim assembled with and retained on the lower spindle; coupling means fittingly engageable in concentric relation with the axis of the tire for releasably coupling the upper and lower spindles; and rim retaining means provided on the lower rim or spindle for holding the upper rim thereon when released from the upper spindle.

According to another aspect of the present invention, there is provided an automatic rim replacing mechanism for tire uniformity inspecting machines, the replacing mechanism further comprising: a transfer means located on one side of the axial lift means and carrying at least two rim assemblies for different tire sizes each containing an upper rim, a lower rim and a lower spindle, the transfer means being movable to set a selected rim assembly in a position immediately above the lift member of the rim lifter.

The above and other objects, features and advantages of the present invention will become apparent from the following description and appended claims, taken in conjunction with the accompanying drawings which show by way of example some preferred embodiments of the invention.

BRIEF DESCRIPTION OF THE DRAWINGS

In the accompanying drawings:

FIG. 7 is a vertically sectioned view of the lock mechanism of FIG. 6.

DESCRIPTION OF PREFERRED EMBODIMENTS

Figure 1:
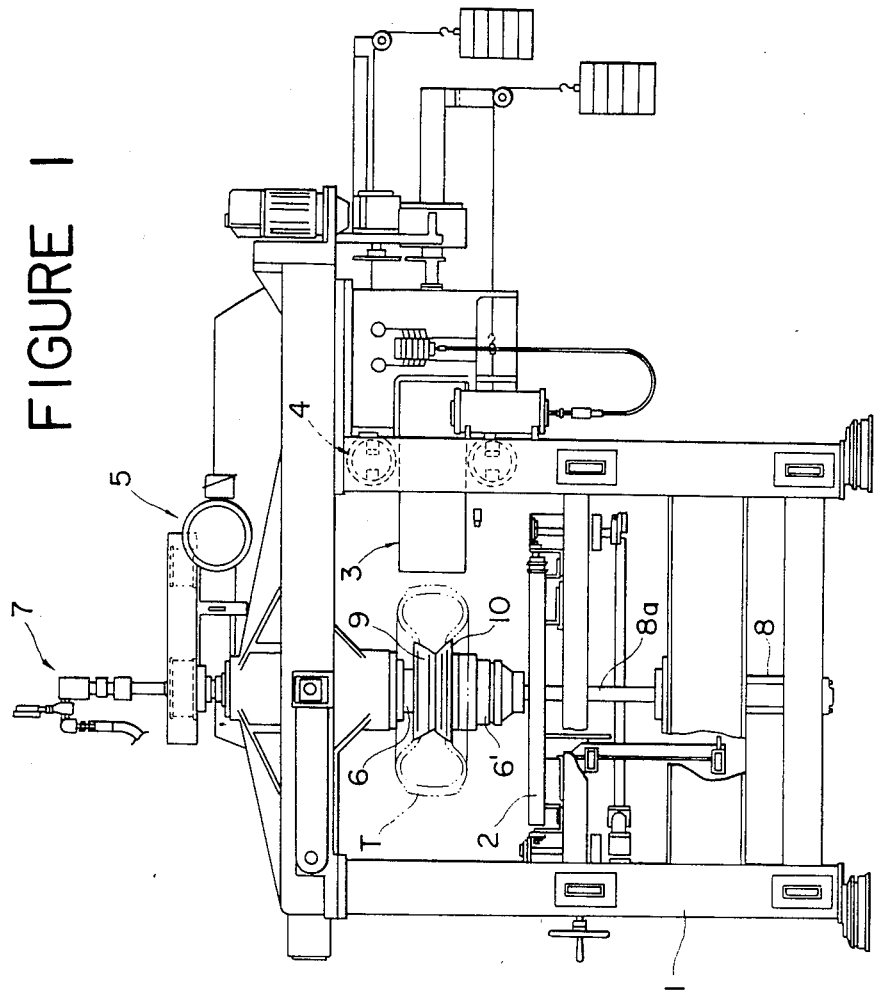
FIG. 1 is a schematic view of a conventional tire uniformity inspecting machine.
Figure 2:
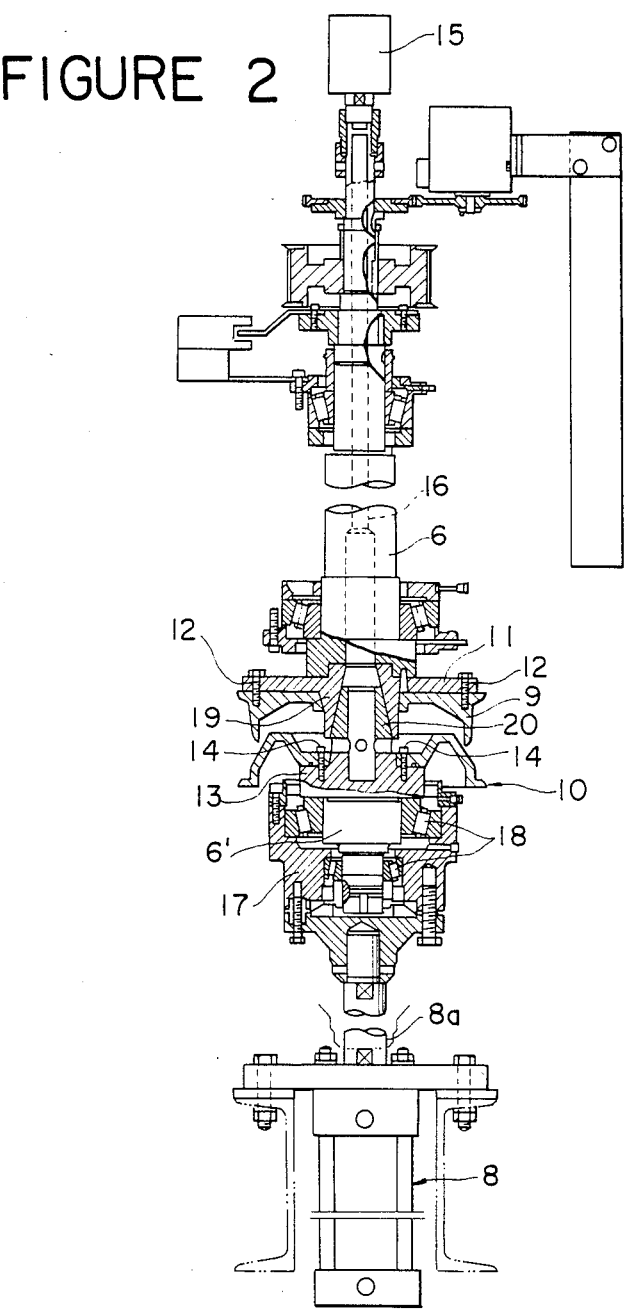
FIG. 2 is a vertically sectioned front view showing a conventional manner of mounting upper and lower rims.

Referring to the accompanying drawings and first to FIGS. 1 and 2, there are shown an example of the conventional tire uniformity inspecting machine and its upper and lower spindle assemblies to explain their outlines before going into details of the invention. As shown in FIG. 1, the tire uniformity machine is provided with a roller conveyer 2 as a transfer means for deliverying a tire T to a main frame 1. Provided perpendicularly to the roller conveyer 2 are a pair of opposing upper and lower spindles 6 and 6' of which the upper spindle 6 is rotated by a rotational drive mechanism 5 and holds an upper rim 9 at the lower end thereof. On the other hand, the lower spindle 6' is supported by a lift member 8a (a piston rod) of a rim lift mechanism 8 constituted by a hydraulic piston-cylinder or the like, and holds a lower rim 10 at the upper end thereof. In this instance, the upper and lower rims 6 and 6' are rotatable integrally with each other to permit uniformity inspection using a load applicator 3 and a load detector 4 in the known manner. Details of the conventional constructions of the upper and lower spindles 6 and 6' as well as the upper and lower rims 9 and 10 are shown in FIG. 2. As seen therein, the upper and lower rims 9 and 10 are detachably and replaceably fixed in position, more particularly, the upper rim 9 is fastened by bolts 12 to a mounting flange 11 which is provided integrally at the lower end of the upper spindle 6, and the lower rim 10 is fastened by bolts 14 to a mounting flange 13 integrally formed at the upper end of the lower spindle 6'. An air feed passage 16 for supplying compressed air into the tire T through a rotary union 15 is formed in the internal bore of the hollow upper spindle 6. The lower spindle 6' is rotatably supported in a lower spindle case 17 through bearing 18. A lift member 8a (a piston rod) of a rim lift means (e.g. a hydraulic piston-cylinder) is fastened by bolts to the spindle case 17 to permit rotational and vertical movements of the lower spindle 6'. Further, the mounting flange 11 at the lower end of the upper spindle 6 and the opposing upper end of the lower spindle 6' are provided with coupling portions 19 and 20 of tapered cone shape which are disengageably held in fitting engagement with each other in the manner known in the art.

In the conventional tire uniformity inspecting machine as described above, the upper and lower rims 9 and 10 which hold a tire T are fastened to the upper and lower spindles 6 and 6' by bolts 12 and 14, respectively. This has been necessitated partly for maintaining the mounting accuracy of the upper and lower rims 9 and 10. In such a case, however, the job of replacing the upper and lower rims 9 and 10 is troublesome and takes a long time as mentioned hereinbefore.

Figure 3:
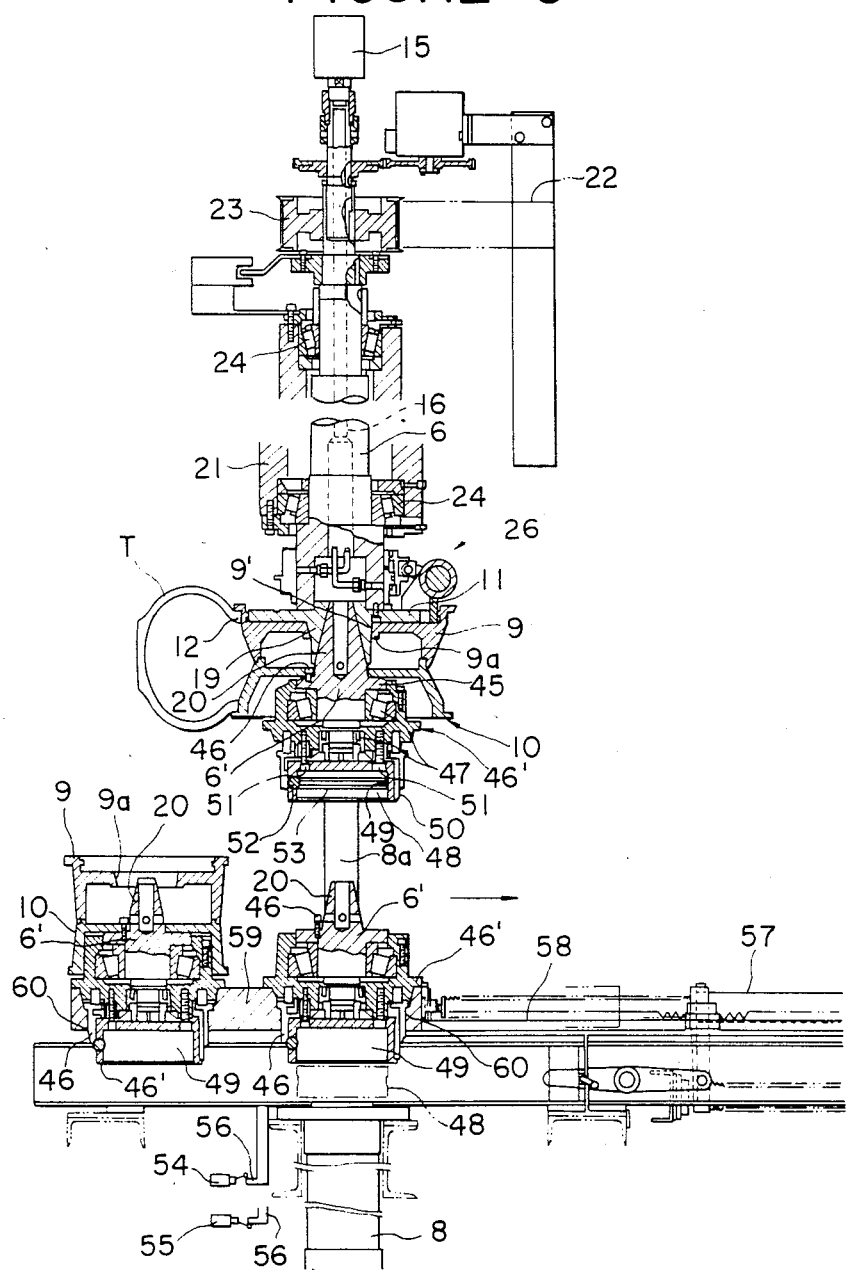
FIG. 3 is a view similar to FIG. 2 but showing an upper and lower rim mounting construction according to the invention.
Figure 4:
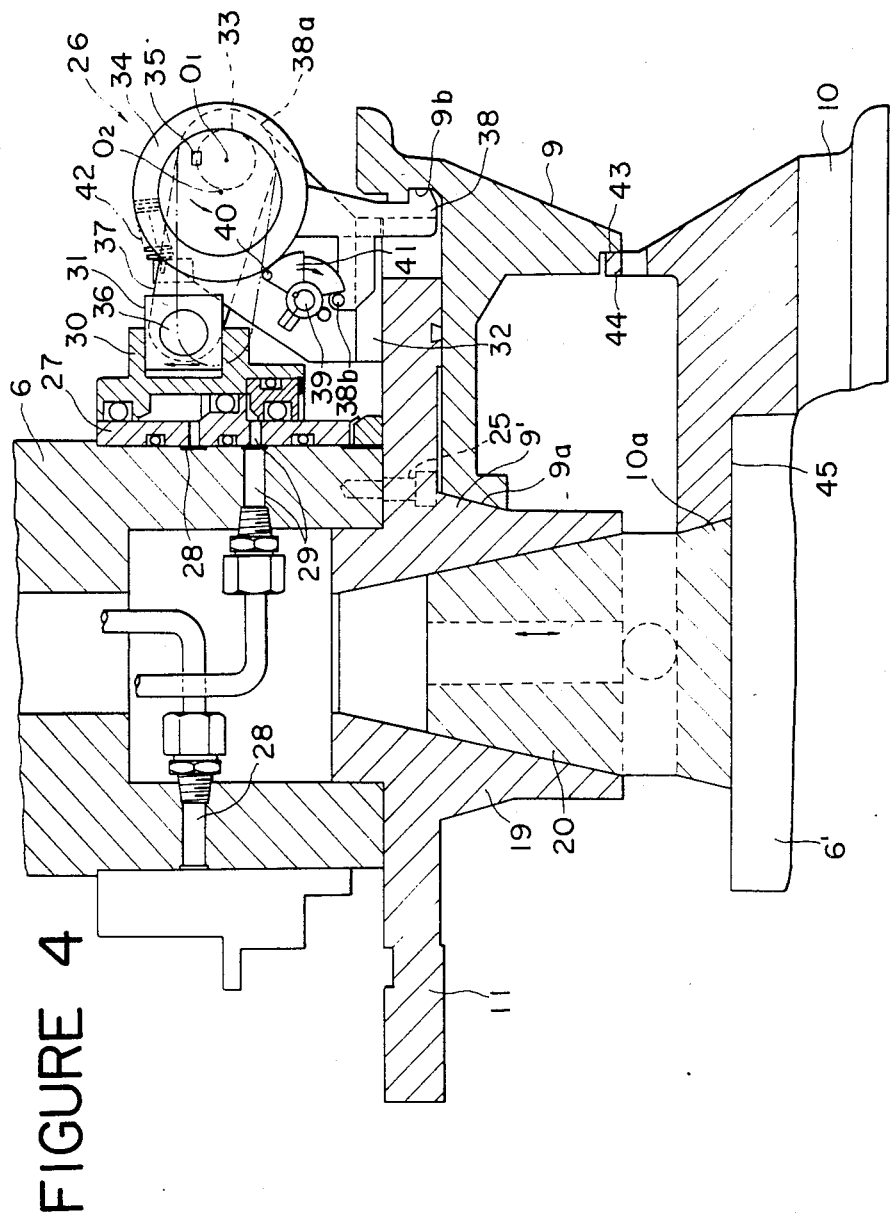
FIG. 4 is a vertical section of an upper rim lock mechanism.

According to the present invention, these problems are solved by provision of an automatic rim replacing mechanism as shown in FIGS. 3 and 4. As seen in FIG. 3, the upper spindle 6 is similarly supported on a holder 21 through a bearing 24 rotatably by means of a timing belt 22 and a belt pulley 23 which belong to the rotational drive mechanism 5. An upper rim 9 is detachably mounted in overlapped relation on the lower side of a rim mounting flange 11 which is fixed by bolts or the like to the lower end of the upper spindle 6 with an air feed passage 16 as shown in FIG. 4. Similarly to the conventional example of FIG. 2, coupling portions 19 and 20 of tapered cone shape, which are separably engageable with each other, are formed opposingly at the centers of the rim mounting flange 11 and the lower spindle 6' in concentric relation with the tire axis. The center hole 9a of the upper rim 9 is disengageably fitted on a tapered cone shape wall 9' which is formed on the rim mounting flange 11 by precision machining in concentric relation with the coupling portion 19. In this instance, the center hole 9a and the opposing outer periphery of the coupling portion 19 are fitted through surfaces of complementary tapered cone shapes as shown. The upper rim 9 which is separably fitted on the lower side of the mounting flange 11 in this manner is attached to or detached from the upper spindle 6 a one-touch action type lock mechanism 26 which is provided between and in association with the upper spindle 6 and mounting flange 11, without fastening by bolts. The lock mechanism 26 includes a cylinder base 27 which is non-rotatably fixed on the outer peripery of a lower portion of the spindle 6 for movement therewith, compressed air feed and discharge ports 28 and 29 provided by the use of the base 27 and the upper spindle 6, a cylinder 30 movable up and down along the base 27, a slide block 31 retained in the cylinder 30, an eccentric shaft 34 journalled on a mounting bracket 32 projectingly fixed on part of the upper side of the rim mounting flange 11 and having its center 02 disposed in eccentric relation with the center 01, a lever 37 having one end thereof connected to the eccentric shaft 34 through a key 35 and having the other end connected to the slide block 31 through a pin shaft 36, and a locking hook 38 having a boss 38a fitted on the outer periphery of the eccentric shaft 34, a guide roller 40 rotatably supported on the mounting bracket 32 through the pin shaft 39 and engageable with the lever 37, and an unclamp lever 41 engageable with a pin 38b provided on part of the locking hook 38. The locking hook 38 of the above-described lock mechanism 26 is disengageably fitted in a locking groove 9b formed on the inner peripheral surface at the upper end of the upper rim 9. A spring 42 is provided between the boss 38a of the locking hook 38 and the mounting bracket 32 to urge the locking hook 38 toward the locking groove 9b. The upper rim 9 is formed with a faucet joint portion 43 around the outer periphery of its lower end, which is separably engageable with the other faucet joint portion 44 formed around the outer periphery of the upper end of the lower rim 10 which is mounted at the upper end of the lower spindle 6' in the manner as will be described hereinlater.

Figure 5:
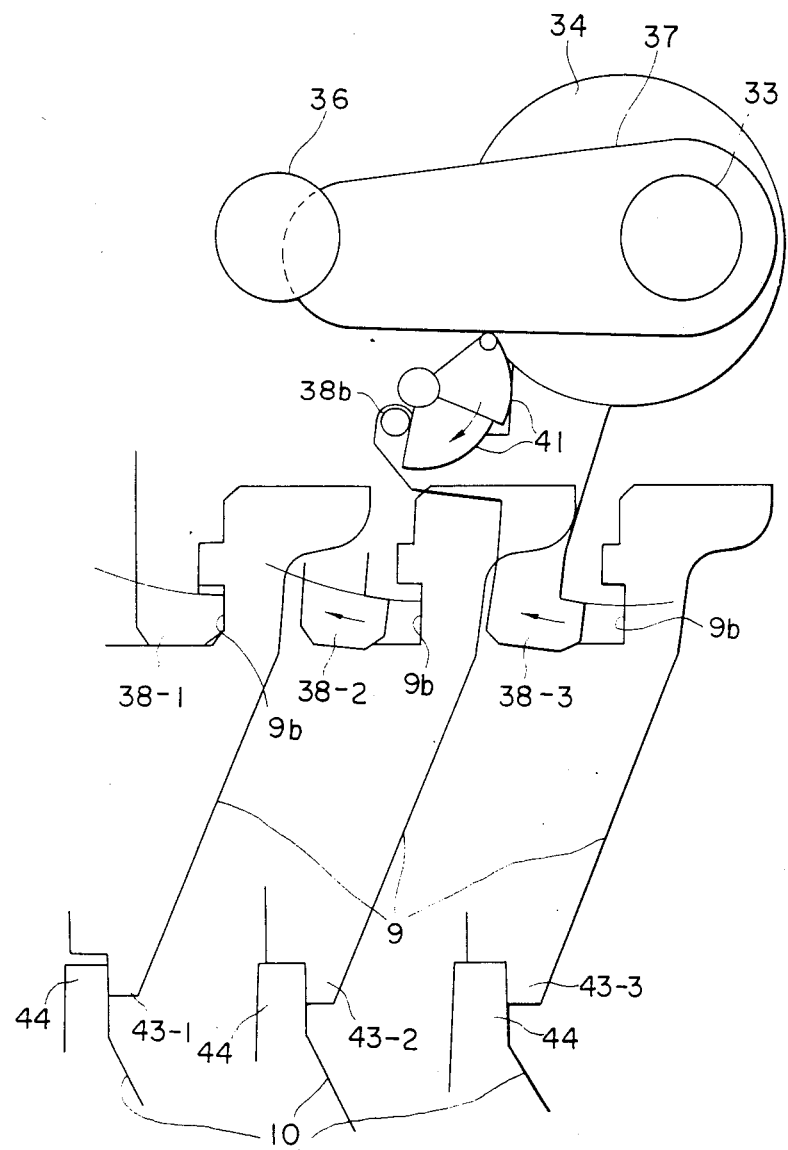
FIG. 5 is a schematic view of the same rim lock means, explaining its motions in operation.

With the above-described lock mechanism 26, the upper rim 9 is automatically fixed to and detached from the upper spindle 6 as shown in FIG. 4 as well as FIG. 5 which shows operational movements of the lock mechanism. FIG. 4 illustrates a state in which the lower spindle 6' has been lifted up by elevation of a lift member 8a of the lift mechanism as described hereinbefore with reference to FIGS. 1 and 2, together with the lower rim 10 which is held on the spindle 6', fittingly coupling the faucet joint portion 44 with the opposing faucet joint portion 43 of the upper rim 9 and engaging the locking hook 38 securely in the locking groove 9b of the upper rim 9 by the spring 42. In order to loosen and disengage the upper rim 9 from the upper spindle 6 in this state, the cylinder 30 is moved downward as indicated by an arrow, pushing down the slide block 31. As a result, the lever 37 which is connected to the block 31 is rotated counterclockwise, and the eccentric shaft 34 which is connected to the lever 37 through the key 35 is rotated about the eccentric bearing rotating portion 33. Therefore, due to its eccentricity of its center 01 relative to 02, the locking hook 38 which is retained on the eccentric shaft 34 through boss 38a is shifted immediately below within the locking groove 9b, forming a play as indicated at 38-1 in FIG. 5. At the same time, the lever 37 pushes down the guide roller 40, so that the unclamp lever 41 is rotated clockwise about the pin shaft 39, and, by this rotation, the lever 41 pulls up the pin 38 of the locking hook 38, so that the hook 38 at 38-1 in FIG. 5 is turned as sequentially indicated by reference numerals 38-2 and 38-3 until it completely disengages from the locking groove 9b of the upper rim 9 thereby to unlock same from the hook 38. As a result, the faucet joint portion 43 of the upper rim 9 is moved at indicated at 43-1, 43-2 and 43-3 in FIG. 5, freed from the mounting flange 11 of the upper spindle 6. Since the faucet joint portions 43 and 44 are coupled with each other, the upper rim 9 is now movable together with the lower rim 10. In a case it is desired to lock the upper rim 9 again to the rim mounting flange 11, this can be attained automatically by raising the cylinder 30 to the upper position of FIG. 4 from the lowered position in an inverse order relative to the above-described procedures.

Figure 6:
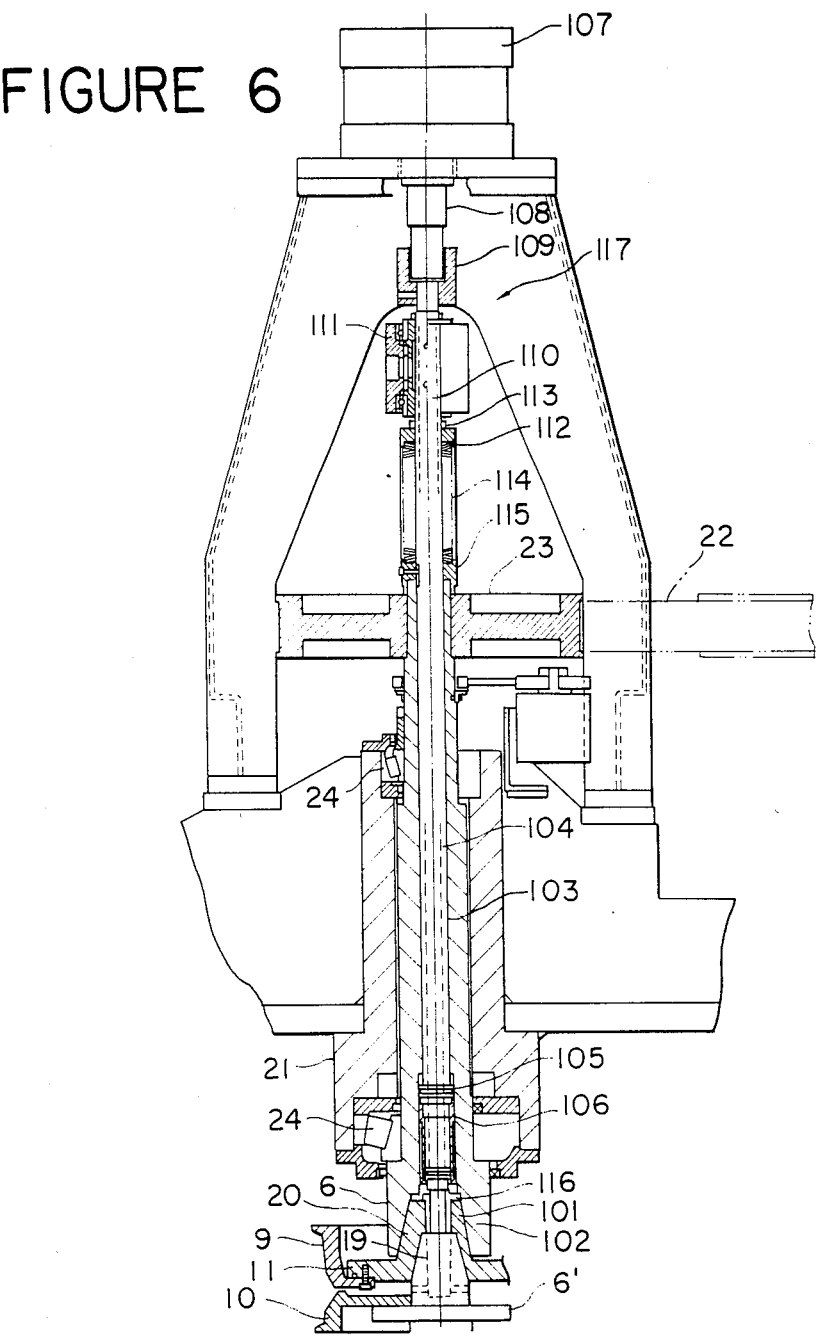
FIG. 6 is a vertically sectioned front view showing another embodiment of the upper rim lock mechanism.

FIGS. 6 and 7 shows another embodiment of the lock mechanism which is simpler in construction and more reliable in centering action, as compared with the lock mechanism 26 of FIGS. 4 and 5 which is located in an offset position relative to the center axes of the upper and lower spindles and arranged to give an outward push to the locking groove 9b by a cam action when lifting up the upper rim 9.

In FIGS. 6 and 7, the lower spindle 6', upper rim 9 and rim mounting flange 11 are detachably assembled through coupling portions 19 and 20 of tapered cone shape which are formed centrally of the respective joining parts in the same manner as in FIGS. 4 and 5. In this case, however, a collet chuck type lock mechanism 117 is provided on a vertically movable rod 104 which is inserted centrally of the upper spindle 6 for releasably fixing the mounting flange 11 to the upper spindle 6. Namely, the upper spindle 6 which is supported in the holder 21 through bearing 24 is rotatable through the timing belt 22 and belt pulley 23. Formed at the lower end of the upper spindle 6 is a coupling portion 102 of a tapered cone shape which is disengageably fitted on a coupling portion 101 of a complementary tapered cone shape formed projectingly at the center of the mounting flange 11. Further, the upper spindle 6 is formed with an axial bore 102 which opens into the coupling portions 102 at the lower end and slidably receives therein the afore-mentioned rod 104. An oil seal 105 serving as an air seal is provided at the lower end of the rod 104 through an annular groove, and a collet chuck 106 is mount beneath the oil seal in such a manner as to hang down from the lower end of the rod 104 to which the upper end of the collet chuck is secured by screws. Securely mounted at the uppermost end of the rod 104 which is projected out of the upper spindle 6 is a joint member 109 for connection to a cylinder rod 108 of an air cylinder 107. On a projected rod portion beneath the joint member 109, a rotary joint 111 is fittingly supported through a bearing to supply compressed air to an air feed passage 110 extending centrally through the rod 104. An upper spring seat 111 is mounted on the rod 14 adjustably through an adjusting nut 113 at a position beneath the rotary joint 111. A compression spring 114 is charged between the upper spring seat 112 and a lower spring seat 115 which is fixedly mounted at the upper end of the upper spindle 6 as shown in FIG. 6, permitting to adjust the spring pressure through the nut 113. Opposingly to the collet chuck 106 which is mounted at the lower end of the rod 104, a lock member 116 is threadedly fixed at the center of the coupling portion 101 of the mounting flange 11 which retains the upper rim 9. As seen in FIG. 7 which shows the constructions of the collet chuck 106 and lock member 116 in greater detail, the collet chuck 106 is provided with a plural number of axial slits 118 at suitable intervals in the circumferential direction to form a number of divided chuck segments each having spring effect. The chuck 106 is provided with bulged portions 120 at the lower ends of the respective chcuk segments which are engageable with a neck portion 119 of the lock member 116. When in free state, the bulged portions 120 are outwardly diverged as indicated at 120a by the spring effect. As shown in FIG. 7, the collet 106 is movable in a slide guide hole 6b formed at the lower end of the center bore 103 of the upper spindle 6 and a lower bore 6a of a larger diameter formed continuously to the lower end of the slide guide bore 6b. The bulged portions 120 securely hold the neck portion 119 of the lock member 116 when retracted into the slide guide bore 6b, and spread apart as indicated at 120a when positioned in the larger-diameter bore 6a.

The above-described lock mechanism 117 including the rod 204 operates in the following manner for automatically locking and unlocking the upper rim 9 relative to the upper spindle 6. Namely, upon lowering the piston rod 108 of the air cylinder 107 to push down the joint member 109 against the action of the spring 114, the rod 104 is pushed down within the axial center bore 103 of the upper spindle 6 along with the collet chuck 106. Accordingly, the bulged portions 120 are spread apart in the larger-diameter bore 6a in free state as indicated at 120a in FIG. 7. In the next phase of operation, an assembly of upper and lower rims 9 and 10 is pushed up from beneath by elevation of the lower spindle 6', raising the neck portion 119 of the lock member 116 to a level above the bulged portions 120 of the chuck 106. In this state, the air cylinder 107 is de-pressurized, whereupon the rod 104 is pulled up by the action of the spring 114 and the bulged portions 120 of the collet chuck 106 are engaged with the neck portion 119 as indicated by solid line in FIG. 7, pulling up the rim mounting flange 11 together with the lock member 116 by the spring force and bringing the tapered conical coupling portions 101 and 102 of the upper spindle 6 and rim mounting flange 11 into intimate engagement with each other. Thus, the upper rim 9 is integrally mounted on the upper spindle 6 in a secure manner by an automatic operation. On the other hand, in order to detach the upper rim 9 from the upper spindle 6, the piston rod 108 of the air cylinder 107 is lowered to free the locking member 116 from the collet chuck 106.

Different from the embodiment of FIGS. 4 and 5, the lock mechanism 117 of FIGS. 6 and 7 is constituted by the rod 104 which is vertically movably supported in the axial center bore 103 in the upper spindle 6 through a spring, the collet chuck 106 which is provided at the lower end of the rod 104 for opening the closing actions concentric with the upper and lower spindles, and the lock member 116 fixedly provided on the part of the part of the rim mounting flange 11. In this case, the locking and unlocking of the upper rim are effected by linear motions in the axial direction of the upper and lower spindles, so that there is almost no possiblity of a centering error at the coupling portions 101 and 102 or at the coupling portions 19 and 20, maintaining centering accuracy in a more reliable and improved manner. Besides, as the lock mechanism 117 is as a whole located concentrically with the axis of the upper spindle 6 and has the collet chuck 106 and lock member 116 accommodated in the upper spindle, it is more compact in construction and simplified in operational motions. Further, the lock mechanism which is not exposed on the outer side of the upper spindle can ensure marked improvement and stabilization in the accuracy of the upper and lower rim assembling operation without inviting complication in construction of the upper and lower rim assemblies. Further, the lock mechanism of FIGS. 6 and 7 is advantageous in view of its superiority in durability and operational stability involving less troubles and irregularities.

The lower rim 10 is mounted on the lower spindle 6' in the following manner according to the invention. As shown in FIG. 3, the lower spindle 6' is provided with the coupling portion 20 projectingly at the center of its upper end, which is disengageably fitted in the coupling portion 19 of the upper rim 9 as mentioned hereinbefore. The lower rim 10 is placed and supported on a flange-like stepped wall portion 45 in the lower portion of the coupling portion 20, with the center hole 10a of the lower rim 10 in engagement with the coupling portion 20, and integrally assembled with the latter by bolts 46 as shown in the drawing. In this instance, as exemplified in FIG. 4, the engaging surfaces of the center hole 10a and coupling portion 20 may be of a tapered cone shape. The lower spindle 6' which is assembled with the lower rim 10 is rotatably retained in a spindle casing 46' through bearings 47 in the same manner as in conventional arrangements. According to the invention, the spindle casing 46' which is integrally with the lower spindle 6' is easily connectible to and separable from the lift member 8a of the lift mechanism 8 through a separable coupling construction. Namely, a coupling head 48 is formed at the upper end of the lift member 8a of the lift mechanism 8, while a coupling cylinder 49 is provided opposingly at the lower end of the spindle casing 46' integrally or separately, disengageably interengaging the coupling head 48 and coupling cylinder 49 by upward movement of the lift member 8a. In the particular example shown, the coupling cylinder 49 is built in through a key 40 and bolts 51. Provided opposingly on the surfaces of the inner periphery of the coupling cylinder 49 and the outer periphery of the coupling head 48 are an interlocking member 52 like a ball mounted on one engaging surface and engageable with an opposing interlocking member 53 like a groove formed on the other engaging surface, constituting a clamp construction to prevent spontaneous disengagement of the coupling members. On the side of the lift mechanism 8, there are provided an upper limit detection member 54 and a lower limit detection member 55 like limit switches for detecting upper and lower limit positions of the lift member 8a to delimit its upward and downward movements. Opposingly to the detection members 54 and 55, a actuating member 56 is mounted on the head portion 48 of the lift member 8a of the lift mechanism 8 for contact with the detection members 54 and 55.

Further, according to the present invention, a transfer means such as a carriage or a transfer or indexing table is provided beneath and in parallel relation with the tire transferring roller conveyer 2, namely, in a direction perpendicular to the lift member 8a of the lift mechanism 8. The transfer means is capable of supporting thereon a lower spindle and at least two sets of upper and lower rim assemblies for selectively transferring them to and from a position on the lift member 8a of the lift mechanism 8. In the particular embodiment shown in FIG. 3, there is employed as an example a carriage 59 which is moved back and forth on a rail 58 by a reciprocal drive means 57 like a transfer cylinder. In this example, the carriage 59 is capable of transferring two sets of rims and lift members 8a in holder holes 60 of a shape and dimensions suitable for setting the lower spindle casing 46 of the lower spindle 6 and permitting passage therethrough of the lift member 8a including the coupling head 48. Of course, this is merely one example, and it is possible to provide a number of holder holes 60 at intervals along the circumference of a rotary disc-like table like an indexing table, transferring the holder holes 60 successively to a position over the lift member 8a by intermittent rotary movements of the table. No matter whether rims are transferred by reciprocal or rotary movements, the holder holes 60 are brought into a concentrically aligned position relative to the lift member 8a by stoppers and stoke control means although not shown.

According to the foregoing embodiment of the invention, the upper and lower rims 9 and 10 are automatically replaced in the following manner. When there arises a necessity for replacing upper and lower rims 9 and 10 for a specific tire size by rims 9 and 10 for a different tire size to change the size of tires T to be inspected, the lift mechanism 8 on the side of the lower spindle 6' is actuated to raise the lift member 8a as explained hereinbefore with reference to FIGS. 3 and 4. Prior to this operation, an empty holder hole 60 in the carriage 59 is positioned immediately above the lift mechanism 8, so that the lift member 8a is extended upward through the empty holder hole 60. The upward movement of the lift member 8a is accompanied by the lower spindle case 46' with the lower spindle 6', namely, by the lower rim 10. As a result, the faucet joint portion 44 of the lower rim 10 is connected to the faucet joint portion 43 of the upper rim 9 as shown in FIG. 4. In a next phase of operation, the cylinder 30 on the upper spindle 6 is lowered to recede the locking hook 38 of the lock mechanism 38 from the locking groove 9b of the upper rim 9, freeing the upper rim 9 from the upper spndle 6 and rim mounting flange 11 and supporting same on the lower rim 10. According, upon lowering the lift member 8a in the next phase of operation, the lower and upper rims 10 and 9 are lowered in overlapped state onto the lower spindle 6', supporting the spindle case 46 of the lower spindle 6'in the holder hole 60 as shown in FIG. 3. By succeedingly lowering the lift member 8a in a sligh degree, its coupling head 48 is automatically disengaged from the coupling cylinder 49 of the spindle case 46 which is held in restricted state by the holder hole 60. Upon detection of this disengagement by the lower limit detector 55 and the actuator 56, the reciprocal drive 57 is actuated to move the carriage 59 thereby bringing into concentric alignment with the lifter 8 another holder hole 60 which supports a rim assembly having upper and lower rims 9 and 10 of a different tire size assembled on a lower spindle 6 and a lower spindle case 46. As a result, the assembly of the previously used upper and lower rims 9 and 10, lower spindle 6' and lower spindle case 46 is shifted to a receded or offset position. Then, the lift member 8a is moved upward toward the holder hole 60 which supports a fresh assembly of the upper and lower rims 9 and 10 and lower spindle 6', fitting the coupling head 48 into the socket cylinder 49 of the spindle case 46 and coupled with the latter integrally. The lift member 8a is further elevated succeedingly until the upper rim 9 which is held on the lower rim 10 on the lower spindle 6' through the connected faucet joint portions 43 and 44 is abutted against the lower side of the rim mounting flange 11, engaging the coupling portions 19 and 20 with each other. Then, the cylinder 30 of the lock mechanism 26 on the upper spindle 6 is moved upward to engage the locking hook 38 with the locking groove 9b of the fresh upper rim 9, completing automatic mounting of the upper rim 9 on the upper spindle 6. Upon completion of the upper rim mounting operation, the lift member 8a is lowered again to reset, in the holder hole 60, the lower rim assembly including the fresh lower rim 10 and the lower spindle 6' and spindle case 46' which support the lower rim 10. Now, a tire T of a new size which is delivered by the roller conveyer 2 is firstly mounted on the lower rim 10 by elevation of the lift member 8a of the lifter 8 and the lower rim assembly including the lower rim, lower spindle 6' and spindle case 46, and then on the upper rim 9 by further elevation of the lift member 8a in the manner known in the art. Th new size tire T which is thus mounted on the upper and lower rims 9 and 10 now undergoes the uniformity inspecting operation including introduction of air into the tire T and application of load. Tires T of the same size can be inspected successively simply by repeating the reciprocal vertical movements of the lower rim 10 and lower spindle 6' on which a tire is placed.

The upper rim lock mechanism 26 provided on the upper spindle 6 is not of course limited to the particular example shown, nor are the faucet joint portions 43 and 44 which link the upper and lower rims 9 and 10 for a joint motion. This rim joint means may be provided on the part of the lower spindle 6' if desired.

According to the present invention, the upper rim 9 is automatically mounted on the upper spindle 6 and releasably retained in position by the lock means, while a lower rim assembly including the lower rim 10 and lower spindle 6' is separably connected to the lift member 8a of the lift mechanism, in contrast to the conventional construction in which the upper and lower rims 9 and 10 are fastened to the upper and lower spindles 6 and 6' by bolts. Further, by the provision of the transfer means in the form of a carriage 59 or the like which is capable of carrying in holder holes 60 a plural number of different rim assemblies each consisting of upper and lower rims for a certain tire size and a lower spindle 6', it becomes possible to replace the upper and lower rims 9 and 10 automatically by ones of a different tire size in a prompt and facilitated manner. Namely, the time required for the replacement of the upper and lower rims can be shortened to a considerable degree, permitting to attain a high efficiency and significant saving of labor. Moreover, according to the mechanism of the invention, it becomes possible to broaden the operational range of one uniformity machine to a variety of tire sizes by selection of a suitable one of rim assemblies which are set in the holder holes 60 on the carriage 59. Any one can replace the rims readily without any special skill since the operation is fully automatic and requires only a push-button action or the like.

With regard to the mounting and assembling accuracy, the lower rim 10 can be assembled with the lower spindle 6' in a place outside the uniformity machine, namely, on a carriage or an indexing table, so that it is quite easy to observe a required accuracy through the assembling work. With respect to the upper rim 9 which is automatically mounted on the upper spindle 6, a high mounting and assembling accuracy is guaranteed by self-aligning actions of various coupling or joint members without using bolts, for example, by self-aligning actions of the coupling portions 19 and 20 of tapered cone shape and the fitting joint between the rim mounting flange 11 and the upper rim 9, as well as by the fitting joint construction between the upper and lower rims 9 and 10 or between the upper rim 9 and lower spindle 6'. There is no problem with regard to the mounting and assembling accuracy as required for the tire uniformity inspecting machine especially in a case using the lock mechanism 117 of FIGS. 6 and 7 which can lock and unlock the upper rim by simplified motions in the axial direction of the upper spindle. Thus, the invention contributes greatly to the improvement of operational efficiency, permitting to provide a universal type uniformity machichine which is not limited to a particular tire size or to tires sizes of a specific narrow range.

What is claimed is:

1. An automatic rim replacing mechanism for tire uniformity inspecting machine, said rim replacing mechanism comprising:
   an upper spindle provided with rotating means for rotation about an axis concentric with the axis of a tire to be inspected;
   an upper rim releasably fixed to said upper spindle by a lock means;
   a lower spindle detachably connectible to a lift member of a rim lifter movable up and down in the axial direction of said tire;
   a lower rim assembled with and retained on said lower spindle;
   coupling means fittingly engageable in concentric relation with the axis of said tire for releasably coupling said upper and lower spindles; and
   rim retaining means provided on said lower rim for holding said upper rim thereon when released from said upper spindle.

2. An automatic rim replacing mechanism as set forth in claim 1, wherein said lock means for said upper rim comprises: a locking groove formed on a peripheral portion of said upper rim, and a locking hook member mounted on the outer periphery of said upper spindle and movable up and down in said locking groove by operation of an eccentric shaft for engaging and disengaging said locking groove.

3. An automatic rim replacing mechanism as set forth in claim 1, wherein said lock means for said upper rim comprises: a rod movable up and down in an axial center bore of said upper spindle, and a collet chuck provided at the lower end of said rod for releasably holding a lock member provided on the part of said upper rim.

4. An automatic rim replacing mechanism for tire uniformity inspecting machine, said rim replacing mechanism comprising:

an upper spindle having rotating means for rotation about an axis concentric with the axis of a tire to be inspected;

an upper rim releasably fixed to said upper spindle by a lock means;

a lower spindle detachably connectible to a lift member of a rim lifter movable up and down in the axial direction of said tire;

a lower rim assembled with and retained on said lower spindle;

coupling means fittingly engageable in concentric relation with the axis of said tire for releasably coupling said upper and lower spindles;

rim retaining means provided on said lower rim for holding said upper rim thereon when released from said upper spindle; and transfer means located on one side of said rim lifter and carrying at least two rim assemblies for different tire sizes each including an upper, a lower rims and a lower spindle, said transfer means being movable to set a selected rim assembly in a position immediately above said lift member of said rim lifter.

5. An automatic rim replacing mechanism as set forth in claim 4, wherein said lock means for said upper rim comprises: a locking groove formed on a peripheral portion of said upper rim, and a locking hook member mounted on the outer periphery of said upper spindle and movable up and down in said locking groove by operation of an eccentric shaft for engaging and disengaging said locking groove.

6. An automatic rim replacing mechanism as set forth in claim 4, wherein said lock means for said upper rim comprises: a rod movable up and down in an axial center bore of said upper spindle, and a collet chuck provided at the lower end of said rod for releasably holding a lock member provided on the part of said upper rim.

* * * * *